United States Patent
Soloway

[11] 3,921,442
[45] Nov. 25, 1975

[54] ACOUSTIC COUPLANT FOR USE WITH AN ULTRASONIC SEARCH UNIT

[75] Inventor: Sidney Soloway, Wilton, Conn.

[73] Assignee: Automation Industries, Inc., Los Angeles, Calif.

[22] Filed: Nov. 28, 1973

[21] Appl. No.: 419,653

[52] U.S. Cl.............................................. 73/71.5 US
[51] Int. Cl.² ......................................... G01N 29/04
[58] Field of Search ................. 73/71.5 US, 67.5 R

[56] References Cited
UNITED STATES PATENTS

| | | | |
|---|---|---|---|
| 3,394,586 | 7/1968 | Cross | 73/71.5 US |
| 3,482,122 | 12/1969 | Lenahan | 73/71.5 US X |
| 3,621,709 | 11/1971 | Frey | 73/71.5 US |
| 3,763,694 | 10/1973 | Rathburn et al. | 73/71.5 US |

*Primary Examiner*—James J. Gill
*Attorney, Agent, or Firm*—Dan R. Sadler

[57] ABSTRACT

Improvements in an acoustic couplant for use with an ultrasonic search unit are disclosed. The search unit 10 includes a transducer crystal 36 for transmitting and/or receiving ultrasonic energy and a couplant member 64 on the face of the search unit for acoustically coupling the search unit to a workpiece 22. The improved couplant member 64 includes a hydrophilic polymer having acoustical properties suitable for coupling the search unit to the workpiece.

6 Claims, 3 Drawing Figures

ACOUSTIC COUPLANT FOR USE WITH AN ULTRASONIC SEARCH UNIT

BACKGROUND

In one form of nondestructive testing system, one or more search units are provided for transmitting ultrasonic energy into a workpiece and for receiving the ultrasonic energy after it has propagated in the workpiece. In a so-called pulse-echo system a search unit is adapted to transmit bursts or pulses of ultrasonic energy in response to a repetitively occurring driving signal. These pulses of ultrasonic energy are propagated into the workpiece whereby echoes are reflected back to the search unit from any acoustical discontinuities such as the surfaces of the workpiece and any cracks, voids, inclusions, etc., which may be inside the workpiece. The search unit in turn generates electrical signals corresponding to the received echoes. By measuring the amplitude and time delay of the resultant signals, it is possible to determine the size and position of the discontinuity.

The ultrasonic energy is normally in a range of about 25 kcs to about 25 mcs. Energy at this frequency travels through a large variety of materials such as most metals, etc., with very little, if any, attenuation. However, at these frequencies the energy is highly attenuated by air. In fact, from a practical standpoint, when the ultrasonic energy has a frequency in the megacycle range, it is virtually completely attenuated by even a relatively short length of air.

In order to overcome this difficulty it has been customary to use some form of a liquid acoustical couplant to eliminate or greatly reduce the attenuation losses. Since water has very little attenuation and a desirable acoustical impedance, it makes an excellent couplant.

In so-called immersion testing, the workpiece is completely submerged in a large tank of water. The search unit is then placed in the water and scanned across the workpiece. Although this is a highly effective form of testing it cannot be used with materials that cannot be contacted by water. Also, it is not practical for situations where the workpiece is too large to fit into a tank and/or is not readily movable.

In so-called contact testing, the search unit is placed in direct contact with the surface of the workpiece. However, a couplant such as a film or puddle of water, glycerine, etc., is maintained between the face of the search unit and the workpiece.

The foregoing arrangements have been reasonably satisfactory and have provided a sufficient degree of acoustical coupling. However, the couplants, such as water, sometimes damage the surface of the workpiece, are messy and difficult to use. As a result, such arrangements do have numerous objections.

SUMMARY

The present invention provides means for overcoming the foregoing difficulties. More particularly, the present invention includes a search unit which can be readily acoustically coupled to the workpiece without the use of messy and inconvenient acoustical couplants.

In the limited embodiment disclosed herein, this is accomplished by means of an acoustical coupling member on the face of the search unit. The coupling member includes a hydrophilic polymer which has an affinity for liquids which have desirable acoustical properties such as water, alcohols, (e.g. glycerin) and/or oil, etc. This results in the couplant member having an acoustical impedance, attenuation losses, etc., which are closely analogous to the optimum couplant. As a result, the search unit may be coupled directly to the surface of the workpiece. Alternatively, the couplant member may be separate from the search unit and coupled to both the search unit and the workpiece in an air-tight manner.

DRAWINGS

DESCRIPTION

Figure 1:
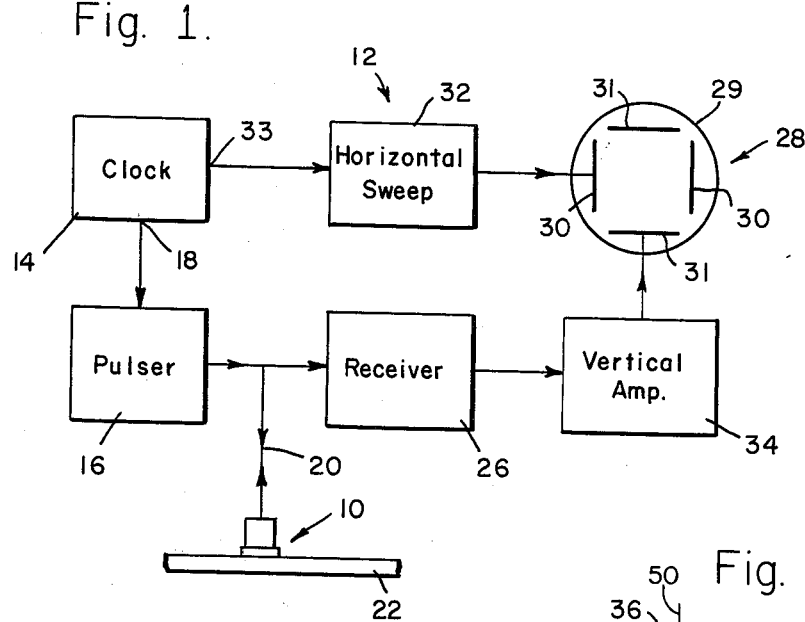
FIG. 1 is a block diagram of a nondestructive testing system employing a search unit embodying the present invention.

Referring to the drawings in more detail, the present invention is particularly adapted to be embodied in an ultrasonic search unit 10 for use in an ultrasonic nondestructive testing system 12. The search unit 10 includes a piezoelectric crystal 36 or a similar type of transducer for generating ultrasonic energy in response to an electrical signal and/or generating an electrical signal in response to incident ultrasonic energy.

The search unit 10 may be employed in any type of ultrasonic nondestructive testing system 12 (i.e., a continuous wave, pulsed, etc.). However, in the present instance by way of example, it is shown as being embodied in a so-called pulse-echo system. Moreover, although the search unit 10 may function as just a transmitter or just a receiver, in the present instance it is shown as functioning as a transmitter and receiver. In addition, it should be noted the search unit 10 may be employed in an immersion type of testing. However, the present embodiment is particularly adapted to be used as a contact search unit placed in direct and intimate contact with the surface of the workpiece 22.

A typical pulse-echo system 12 suitable for use with the search unit 10 is shown in FIG. 1. A pulse generator is shown in the form of a clock 14 which produces a series of repetitively or periodically occurring timing or clock pulses. The clock pulses are effective to determine the repetition rate at which the entire system 12 operates. This repetition rate is not believed to be particularly critical and may vary over a wide range. However, by way of example, it may be in the region of about 1 kilocycle per second.

A transmitter pulser 16 is coupled to one of the outputs 18 of the clock 14. The pulser 16 is thereby made responsive to the clock pulses whereby it will operate synchronously therewith. Each time a clock pulse occurs, the pulser 16 produces a pulse suitable for driving the search unit 10. This is normally a high-voltage pulse which may persist for a single cycle or less. Alternatively, it may include a limited number of cycles, for example five to ten or somewhat more. The frequency of the pulse may be in a range from about 25 kilocycles up to 25 megacycles or even higher.

The output of the pulser 16 is coupled to the search unit 10. Normally this is accomplished by means of a flexible, coaxial cable 20 whereby the search unit 10 may be portable and easily movable by the operator so that it may be coupled to the surface of the workpiece 22 and scanned thereacross.

Each time a driving pulse from the pulser 16 is applied to the transducer crystal 36 in the search unit 10, a corresponding burst or pulse of ultrasonic energy is generated. This pulse in turn is transmitted from the face 24 of the search unit 10. The attenuation of ultrasonic energy in air is very large, especially at the higher frequencies. It is therefore highly desirable to provide a high degree of coupling between the face 24 of the search unit 10 and the workpiece 22.

Heretofore, in the so-called contact form of testing, this coupling has been provided by utilizing some form of a liquid couplant such as glycerin, etc. A film or puddle of the couplant has been maintained on the surface of the workpiece 22. The face 24 of the search unit 10 was then submerged into this film or puddle whereby it was coupled to the workpiece 22. This has been inconvenient, messy and difficult to do, particularly on vertical surfaces where the liquid tends to flow off the surface.

Any returning ultrasonic energy incident on the face 24 of the search unit 10 will propagate to the transducer crystal 36 and cause a corresponding electrical signal to be generated. This signal which is usually referred to as an RF signal, has a "carrier" which is the same frequency as the ultrasonic energy. The carrier is modulated in amplitude by the echoes which are returned to the search unit 10. Thus, the RF signal has a series of pulses spaced there-along.

The resultant RF signal is coupled back over the coaxial cable 20 into a receiver 26. The receiver 26 is effective to receive or detect the electrical signal. The receiver 26 is effective to remove the carrier and one side of the envelope to thereby form a so-called video signal.

The video signal on the output of the receiver 26 is coupled to one or more suitable utilizing or indicating means. Although these may be any of a wide variety, in the present instance, by way of example, an oscilloscope 28 is shown. The oscilloscope 28 includes a cathode ray tube 29 having horizontal and vertical deflection means such as horizontal plates 30 and vertical plates 31.

A horizontal sweep generator 32 is coupled to the second output 33 of the clock 14 and to the horizontal deflection plates 30. As a consequence, each time a clock pulse occurs, the electron beam is swept horizontally across the face of the cathode ray tube 29.

The output of the receiver 26 is connected to a vertical deflection amplifier 34 so as to couple the video signal thereto. The amplifier 34 in turn is coupled to the vertical deflection plates 31 in the cathode ray tube 30.

The combination of the horizontal scan and the vertical deflection is effective to create a visual display on the face of the tube 29. The display includes a horizontal trace with one or more vertical marks spaced there-along. These marks correspond to the driving signal originally applied to the search unit 10 and any signals produced by the search unit 10 as a result of its receiving any returning echoes of ultrasonic energy.

The horizontal displacement of the marks along the trace corresponds to the time of reception of such echo and therefore is a function of the range or distance of the reflecting target or discontinuity in the workpiece. The amount of the vertical deflection or vertical height of the mark of the trace is a function of the magnitude of the echo and is therefore a function of the size of the target or discontinuity.

Figure 2:
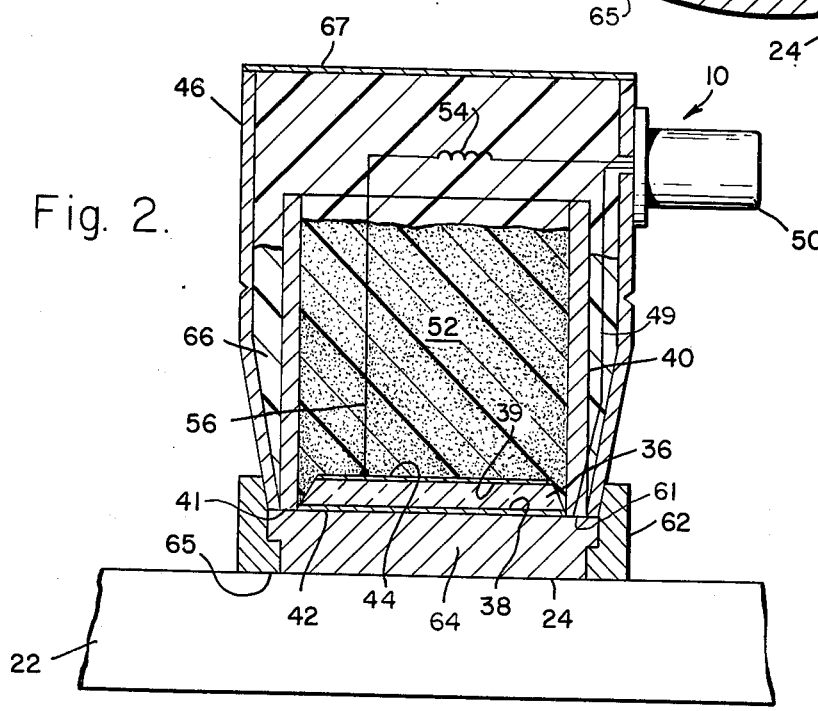
FIG. 2 is a cross-sectional view of the search unit of FIG. 1.

Directing attention now more specifically to the search unit 10, illustrated in detail in FIG. 2, it will be seen that the unit 10 includes a generally cylindrical outer shell or housing 46. This housing may be of any material. It is preferably light in weight, relatively rigid, durable and inexpensive. It will be apparent that many types of plastic or similar materials would be suitable for the outer shell or housing 46. However, the housing 46 is normally a lightweight, electrically conductive metal.

Concentrically positioned within the housing 46 is an inner housing in the preferable form of a cylinder 40 which may be open at both ends and which has a length less than the length of housing 46. The inner cylinder 40 is arranged and disposed within housing 46 so that the forward end 41 of cylinder 40 terminates generally flush with the forward end or edge 61 of housing 46.

In order to transmit and receive the ultrasonic energy, the search unit 10 includes an electro-acoustic transducer such as a piezoelectric member or crystal 36. The cylinder 40 has a diameter which is generally equal to the outside diameter of crystal 36 and supports the crystal 36 at the end 41. The crystal 36 is normally a flat member of uniform thickness having parallel front and back sides or faces 38 and 39.

It has been found desirable to provide electrodes 42 and 44 on one or both of the faces 38 and 39 of the crystal 36. The electrodes 42 and 44 are normally a very thin film of metal which is vapor deposited, electroplated, etc., onto the faces 38 and 40 of the crystal 36. When an electric potential is applied to the opposite sides or faces 38 and 40 of such a crystal 36, the crystal 36 is physically distorted.

As a consequence of this physical distortion, the crystal 36 vibrates mechanically and radiates such mechanical vibrations (i.e., ultrasonic energy) into the surrounding environment. Conversely, when mechanical vibrations (i.e., ultrasonic energy) are incident upon the crystal 36, electric signals are generated by the crystal 36 between the opposite faces 38 and 40.

When the ultrasonic energy is transmitted from the front surface 38 of the crystal 36, some ultrasonic energy is also transmitted from the backside of the crystal 36 into the interior of the search unit. If this energy is not dispersed or absorbed, it returns to the crystal 36 and tends to materially interfere with the desired operation of the crystal 36. In addition, when the crystal 36 physically vibrates it tends to "ring" (i.e., continues to vibrate) after the driving signal terminates. If this "ringing" continues, it will also interfere with receiving the ultrasonic energy and the resultant signal.

In order to prevent the spurious ultrasonic energy and ringing from degrading the operation of the search unit 10, a suitable backing compound 52 may be bonded onto the rear of the crystal 36. This absorbs and attenuates the rearwardly propagating ultrasonic energy and also dampens the vibrations of the crystal. By way of example, this compound 52 may be similar to that disclosed and claimed in copending application Ser. No. 272,807 filed July 18, 1972, in the name of Jerry McElroy entitled "Ultrasonic Search Unit" and assigned to record to Automation Industries, Inc.

A suitable connector 50 is provided on the exterior of the housing 46 for electrically interconnecting the crystal 36 with the transmitter-receiver. Normally this connector 50 is of a variety suitable for mating with the usual form of connector on the coaxial cable 20. The body of connector 50 may be metallic and is connected to electrode 42 by lead 49 and to electrode 44 by inductance 54 and lead 56 and thus constitutes the ground for the cable in which event the body thereof may be electrically grounded to the aforementioned shielding on the inner surface of housing 46.

As indicated above, the ultrasonic energy is highly attenuated by air. It is therefore highly desirable to acoustically couple the transducer crystal 36 in the search unit 10 to the surface of the workpiece 22 by a path which is free of any air, etc. Thus, as particularly contemplated within the present invention, hydrophilic polymer couplant means are provided for acoustically coupling the crystal 36 to the surface of workpiece 22. In the exemplary embodiment, such hydrophilic polymer couplant means, indicated generally at 60, comprises a hydrophilic polymer couplant member 64 secured on the end of the search unit 10 by a suitable retainer ring 62 secured to the lower end of housing 46 and projecting beyond end 61.

The piezoelectric crystal 36 may be of any desired shape but is preferably a flat disc of uniform thickness so as to define the upper and lower faces 38 and 39, respectively, which are planar and parallel. The periphery of crystal 36 may be cylindrical although the periphery may be beveled or chamfered, as a chamfer 63 at an angle in certain applications and constructions which receives a portion of the backing compound 52 as shown.

The crystal 36 may be formed from conventional materials used for forming piezoelectric crystals such as lead zirconate titanate which has been found highly satisfactory in application.

The ring 62 may have a forward end 65 that defines a wear face that is substantially coplanar with the face 24 of the couplant member 64. The wear ring may be formed of any suitable wear-resistant material such as a high density aluminum oxide which provides an extremely hard, durable, abrasion-resistant, protective ring that prevents wearing away of the couplant member 64. Of course, ring 62 need not necessarily be wear-resistant.

A ceramic of this variety has been found to be more wear resistant than the steel from which the outer shell or housing of a search unit head is presently commonly constructed. As a result, it is not easily worn away. Accordingly, the peripheral edges of couplant member 64 do not become exposed as described above.

Crystal 36 may be mounted in the counterbored portion of the forward end of inner cylinder 40 by any suitable means. By way of example, a suitable potting compound such as an epoxy resin may be used. Of course other means for securing the crystal 36 in inner housing 40 may be used bearing in mind that it is desirable that crystal 36 be hermetically sealed in inner housing 40. It is highly desirable to prevent any air spaces between electrodes 42 and 44 as such air space could allow an electric arc discharge to occur between the shielding material and the electrodes. The couplant member 64 may be bonded to wear ring 62, housings 40 and 46 and crystal 36 in like manner.

After crystal 36 is mounted in inner housing 40, and wear ring 62 and couplant member 64 are in proper position, the aforementioned dampening material or backing compound 52 may be used to fill the cavity of housing 40. The void space between outer housing 46 and inner housing 40 may be filled with a potting compound 66. A cap 67 may be attached to the back of search unit 10 for identification, etc.

Referring once again to the hydrophilic polymer couplant means, indicated generally at 60 and as particularly contemplated within the present invention, the couplant member 64 may be any hydrophilic polymer having an affinity for water, alcohol (e.g. glycerin) and/or oils, etc.. This results in a couplant member having an acoustical impedance, attenuation losses, etc., which are closely analagous to the optimum couplant, such as water, without the inherent disadvantages thereof. For example, the couplant member 64 of the invention may be used in a vertical position where the use of water as a couplant would be extremely difficult. Thus, the search unit 10 disclosed herein may be coupled directly to the surface of the workpiece regardless of the orientation of the workpiece.

Although couplant member 64 has been disclosed in an exemplary embodiment of the invention as an integral part of the search unit 10, it may be used with any known search unit and merely disposed between the search unit and the workpiece being tested.

Figure 3:
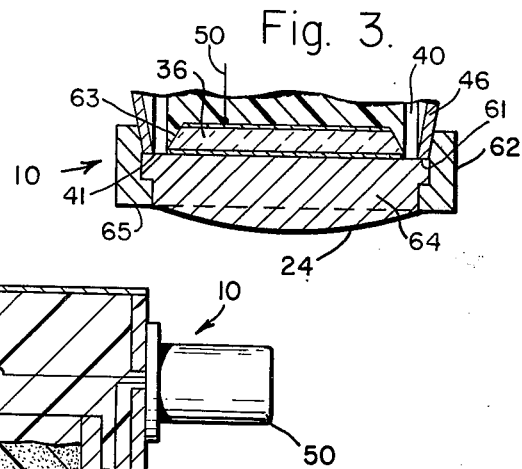
FIG. 3 is a view similar to FIG. 2 showing a portion of the search unit prior to contact with the workpiece.

The couplant member 64 may be in any suitable state for the uses disclosed hereinabove. Thus, the hydrophilic polymer may be a deformable solid material so that it conforms to either the surface of the workpiece or to the surface of the transducer of the search unit or both so as to conform to any surface irregularities thereon. For example, as shown in FIG. 3, couplant member 64 may be of a generally deformable material so that it bulges beyond the plane of forward end 65 of ring 62 prior to contact with the workpiece 22 of FIG. 2. That is, when search unit 10 is placed into contact with workpiece 22, the portion of couplant member 64 bulging beyond the plane of forward end 65 of ring 62 is compressed into the main body portion of couplant member 64 as shown in FIG. 2. This provides an air tight seal between the contacting surface of workpiece 22 and the search unit 10 as the member 64 conforms to any surface irregularities on the workpiece.

Although the hydrophilic polymer comprising the couplant member 64 has the desired acoustic properties for carrying out the invention as discussed hereinabove, it may be desirable to increase its acoustic abilities. Thus, as particularly contemplated within the present invention, means are provided for increasing the acoustic properties of the hydrophilic polymer.

In the exemplary embodiment, such means comprises the step of dipping or otherwise immersing the hydrophilic material in water, alcohols, oils, glycerin, or any other suitable liquids until the hydrophilic polymer is saturated with the liquid to thereby form a continuously wet surface that is acoustically coupled to the workpiece. That is, the hydrophilic polymer may be treated so as to retain therein a liquid having acoustical properties which liquid does not evaporate for a relatively long time.

A liquid may be used that is selected from the group of liquids having the desired acoustical properties, for example water, glycerin, etc. The liquid is cohesively bonded within the polymer in a manner substantially preventing the loss of liquid therefrom. Preferably, water, being inexpensive and readily available, is used. Thus, any suitable hydrophilic polymer containing reactive groups capable of forming hydrogen bonds with the aforementioned liquids may be used. Preferably, such reactive groups are hydroxyl ions.

The use of such liquid in the hydrophilic polymer disclosed herein reduces friction between the polymer and the workpiece being tested. No bubbling, water tanks, or other means of supplying a liquid couplant between the workpiece and the search unit is necessary. The couplant member 64 glides easily with low friction along the surface of the workpiece, particularly if wet. It follows the surface variations thereof. By adding liquid to the couplant member 64, no dry spots are present and the liquid is retained therein for an indefinite period of time and as a thin film on the surfaces of the couplant.

If alcohol is used for the liquid, the alcohol is preferably selected from the group consisting of monohydric alcohol, dihydric alcohol or trihydric alcohol. For example, a trihydric alcohol having less than five carbon atoms, such as glycerin, may be used.

One example of a suitable hydrophilic polymer that may be used in the exemplary embodiment of the invention is an acrylic hydrophilic polymer, such as hydroxyethyl methacrylate.

Although the hydrophilic polymer has been disclosed heretofore as preferably a deformable solid material, such solid material may be practically in a liquid state, relatively rigid, or of a jelly-like consistency. Preferably, however, the material is elastomeric and pliable but fairly rigid, as for example, medium hard rubber, so that it deforms to some degree and follows the contours of the surface of the workpiece being tested.

In summary, a workpiece may be tested using a search unit having an ultrasonic transducer therein by placing one surface of a solid hydrophilic polymer in air-tight contact with the transducer and placing the other surface of the polymer in air-tight contact with the surface of the workpiece. The polymer may be deformable so as to conform to any irregularities on the surface of the workpiece and have the same acoustical properties as a liquid selected from the group consisting of water and alcohol. Thus, the messy and inconvenient use of water or the like, which also tends to evaporate very quickly, as a liquid couplant is avoided. Further, the workpiece may be tested in any orientation thereof since the hydrophilic polymer may be used in any position. The hydrophilic polymer may be an integral part of the search unit as disclosed herein or it may be used as a separate member. For example, the hydrophilic polymer may be in the form of a small piece like a wedge etc. which is moved around with the search unit or it may be in the form of a flexible sheet etc. which is laid over the workpiece whereby the search unit is moved around on the sheet. It will be apparent to those having skill in the art that variations and modifications of the search unit, couplant and method for ultrasonic testing herein disclosed may be made without departing from the scope of the invention.

What is claimed:

1. A method for ultrasonically testing a workpiece or the like by a transducer transmitting sound waves therein, the method including the steps of placing a hydrophilic material in air-tight contact between said transducer and the surface of said workpiece, said material is a polymer containing reactive groups capable of forming hydrogen bonds with a liquid, cohesively bonded thereto in a manner substantially preventing the loss of said liquid therefrom, and transmitting ultrasonic energy through said material.

2. A method for ultrasonically testing a workpiece or the like by a transducer transmitting sound waves therein, the method including the steps of placing a hydrophilic material in air-tight contact between said transducer and the surface of said workpiece, said material is a polymer containing reactive hydroxyl ion groups capable of forming hydrogen bonds with a liquid cohesively bonded thereto in a manner substantially preventing the loss of said liquid therefrom, and transmitting ultrasonic energy through said material.

3. A method for ultrasonically testing a workpiece or the like by a transducer transmitting sound waves therein, the method including the steps of placing a hydrophilic acrylic material in air-tight contact between said transducer and the surface of said workpiece, said material includes a liquid cohesively bonded thereto in a manner substantially preventing the loss of said liquid therefrom, and transmitting ultrasonic energy through said material.

4. A method for ultrasonically testing a workpiece or the like by a transducer transmitting sound waves therein, the method including the steps of placing a hydrophilic material which is the acrylic polymer methacrylate in air-tight contact between said transducer and the surface of said workpiece, said material includes a liquid cohesively bonded thereto in a manner substantially preventing the loss of said liquid therefrom, and transmitting ultrasonic energy through said material.

5. An electro-acoustic ultrasonic search unit including the combination of an electro-acoustic transducer having a face effective to transmit ultrasonic energy therefrom, and a hydrophilic couplant member on said face for coupling ultrasonic energy therethrough, said couplant member being a hydroxyethyl methacrylate.

6. The combination for inspecting a workpiece including a search unit having a face for engaging the surface of the workpiece, an ultrasonic transducer in said search unit, said transducer being effective to transmit and/or receive ultrasonic energy, and a hydroxyethyl methacrylate ultrasonic couplant member disposed on the face of said search unit, said couplant member being effective for coupling the ultrasonic energy between said search unit and said workpiece.

* * * * *